United States Patent
Tischer (10) Patent No.: US 7,797,023 B2
(45) Date of Patent: Sep. 14, 2010

(54) METHODS, SYSTEMS, AND COMPUTER PROGRAM PRODUCTS FOR IMPLEMENTING AN AD-HOC, AUTONOMOUS COMMUNICATIONS NETWORK

(75) Inventor: Steven Tischer, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 215 days.

(21) Appl. No.: 11/148,511

(22) Filed: Jun. 9, 2005

(65) Prior Publication Data

US 2006/0280137 A1    Dec. 14, 2006

(51) Int. Cl.
 H04M 1/00    (2006.01)
 H04B 1/38    (2006.01)
 H04B 7/00    (2006.01)

(52) U.S. Cl. .............. 455/574; 455/572; 455/90.3; 370/310

(58) Field of Classification Search .......... 370/310; 455/550.1, 572, 573, 574, 90.1, 90.3, 425
See application file for complete search history.

(56) References Cited

U.S. PATENT DOCUMENTS

| | | | |
|---|---|---|---|
| 4,870,700 A * | 9/1989 | Ormanns et al. ............. 455/92 |
| 5,680,441 A * | 10/1997 | Gallo ..................... 455/74.1 |
| 5,926,101 A | 7/1999 | Dasgupta |
| 6,697,103 B1 | 2/2004 | Fernandez et al. |
| 6,956,614 B1 | 10/2005 | Quintana et al. |
| 7,079,176 B1 | 7/2006 | Freeman et al. |
| 7,095,732 B1 * | 8/2006 | Watson, Jr. ............. 370/346 |
| 7,266,396 B2 * | 9/2007 | Terzian et al. ............ 455/573 |
| 7,299,034 B2 * | 11/2007 | Kates .................... 455/415 |
| 7,321,387 B2 | 1/2008 | Novais et al. |
| 7,323,991 B1 | 1/2008 | Eckert et al. |
| 7,370,077 B2 | 5/2008 | Pradhan et al. |
| 7,382,798 B2 * | 6/2008 | Sugaya .................... 370/443 |
| 7,426,197 B2 | 9/2008 | Schotten et al. |
| 2001/0026552 A1 | 10/2001 | Spratt et al. |
| 2001/0045978 A1 | 11/2001 | McConnell et al. |
| 2002/0009971 A1 | 1/2002 | Spratt |
| 2003/0093797 A1 | 5/2003 | Bazzaz |
| 2003/0117316 A1 | 6/2003 | Tischer |
| 2004/0029582 A1 * | 2/2004 | Swab et al. ............. 455/426.1 |
| 2004/0074448 A1 | 4/2004 | Bunt et al. |
| 2004/0081166 A1 * | 4/2004 | Stanforth et al. ....... 370/395.32 |
| 2004/0116072 A1 * | 6/2004 | Lobo ..................... 455/41.2 |

(Continued)

OTHER PUBLICATIONS

U.S. Appl. No. 10/785,914, filed Feb. 24, 2004.

(Continued)

Primary Examiner—Andrew Wendell
(74) Attorney, Agent, or Firm—Cantor Colburn LLP (57) ABSTRACT

Methods, systems, and computer program products for implementing an ad-hoc, autonomous communications network is provided. The method includes activating a power supply for a first article embedded with communications components. The power supply is generated by at least one of a power source of the communications components and a power generator of the communications components that is implemented via active motion of the first article. The method also includes broadcasting a transmission event via the first article for a time period less than or equal to the life of the power supply. The method further includes detecting a communications node within a proximity of the first article, the communications node receiving the transmission event.

21 Claims, 4 Drawing Sheets

U.S. PATENT DOCUMENTS

| | | |
|---|---|---|
| 2004/0156616 A1 | 8/2004 | Strub et al. |
| 2005/0063416 A1* | 3/2005 | Shin et al. .................. 370/465 |
| 2005/0135286 A1 | 6/2005 | Nurminen et al. |
| 2005/0143145 A1* | 6/2005 | Maekawa .................. 455/574 |
| 2005/0157661 A1* | 7/2005 | Cho .......................... 370/254 |
| 2006/0025180 A1* | 2/2006 | Rajkotia et al. ............ 455/574 |
| 2006/0029010 A1* | 2/2006 | Belcea ...................... 370/310 |
| 2006/0046719 A1* | 3/2006 | Holtschneider ............ 455/434 |
| 2006/0062175 A1 | 3/2006 | Ling et al. |
| 2006/0100002 A1* | 5/2006 | Luebke et al. .............. 455/574 |
| 2006/0167647 A1* | 7/2006 | Krumm et al. ............. 702/130 |
| 2006/0194564 A1* | 8/2006 | Hokimoto et al. ........ 455/343.2 |

OTHER PUBLICATIONS

U.S. Appl. No. 10/941,118, filed Sep. 15, 2004.
U.S. Appl. No. 10/013,126, filed Dec. 15, 2004.
U.S. Appl. No. 11/085,662, filed Mar. 21, 2005.

* cited by examiner

METHODS, SYSTEMS, AND COMPUTER PROGRAM PRODUCTS FOR IMPLEMENTING AN AD-HOC, AUTONOMOUS COMMUNICATIONS NETWORK

BACKGROUND

Exemplary embodiments relate generally to communications services, and more particularly, to methods, systems, and computer program products for implementing an ad-hoc, autonomous communications network.

Various technologies exist for enabling communications between and among devices, such as telephones, computers, personal digital assistants, and pagers, to name a few. Several communication or transmission protocols have been adopted for facilitating these communications and corresponding network elements. In a wireless networking environment, devices supporting wireless communications typically rely on some type of power source (e.g., battery) that must be periodically recharged in order to maintain operability. In addition, these devices generally require the assistance of a centralized networking system (e.g., host system, cell tower, base station, etc.) to effectuate wireless communications. For example, a telephone number of a target cell phone is entered into a calling cell phone. The call signal is relayed to systems or equipment managed by a service provider which routes the call signal through one or more networks before it is received at the target cell phone.

There may be situations that occur in which direct, peer-to-peer transmissions (without the aid of an intermediary) are desirable, e.g., a catastrophic event causing a communications network servicing a geographic region to become disabled. Another example is a situation or event occurring in a region that is without adequate communications capabilities (such as a remote area). What is needed is a way to provide direct, peer-to-peer communications among devices without the requirement of an intermediary.

SUMMARY

The above disadvantages and shortcomings are overcome or alleviated by methods, systems, and computer program products for implementing an ad-hoc, autonomous communications network. Methods include activating a power supply for a first article embedded with communications components. The power supply is generated via at least one of a power source of the communications components and a power generator of the communications components that is implemented via active motion of the first article. The method also includes broadcasting a transmission event via the communications components of the first article for a time period less than or equal to the life of the power supply. The method further includes detecting a communications node within a proximity of the first article, the communications node receiving the transmission event.

Systems for implementing an ad-hoc, autonomous communications network include a first article embedded with communications components. The communications components include a power supply generated by at least one of a power source of the communications components and a power generator of the communications components that is implemented via active motion of the first article. The communications components also include a transmitter and a transmission event broadcast by the transmitter for a time period less than or equal to the life of the power supply. The communications components further include a means for detecting a communications node within a proximity of the first article, the communications node receiving the transmission event.

Computer program products for implementing an ad-hoc, autonomous communications network comprise instructions for performing a method. The method includes activating a power supply for a first article embedded with communications components. The power supply is generated via at least one of a power source of the communications components and a power generator of the communications components that is implemented via active motion of the first article. The method also includes broadcasting a transmission event via the first article for a time period less than or equal to the life of the power supply. The method further includes detecting a communications node within a proximity of the first article, the communications node receiving the transmission event.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES.

DETAILED DESCRIPTION OF EXEMPLARY EMBODIMENTS

In accordance with exemplary embodiments, the ad-hoc, autonomous networking system enables mobile units to discover and interconnect with communications devices, including other mobile units, within a given proximity. Mobile units refer generally to articles embedded with network elements. The mobile units may be wireless, wireline, or a combination of both. The communications may be enabled using one or more communications and network protocols (e.g., Wireless Fidelity (WiFi), Zigbee protocol, ultra wide band, etc.). Additionally, the mobile units may be auto-powered and self-powered (e.g., as in the case where the mobile unit has a resident power source, such as a battery), creating an ad-hoc networking paradigm that can be perpetuated by movement (e.g., walking motion).

By enabling mobile units with network connectivity and the ability to discover others within a proximity, an unlimited number of communications networks can be enabled. With relatively little hardware, common items such as shoes, can be enabled with basic components such as power generation, transmission and receiver capabilities sufficient to create a networking node for contacting at least one other such node in the immediately proximity.

The ad-hoc, autonomous networking system may be implemented for a variety of usages such as entertainment, automatic information collection, and syndromic surveillance as will be described further below. For example, an entertainment application may be a social situation whereby individuals who collectively gather for an event, pass on intangible information 'droppings' that are picked up by others (whether acquaintances or not). The information, or transmissions, may be short text messages, light displays, images, music, or similar types of transmissions. Further, the transmissions may be directly targeted to selected mobile units such that only the targeted mobile units are capable of receiving the transmissions, provided they are within range of the broadcasts.

Automatic information collection refers to specific information collected from mobile units. For example, a venue hosting an event may track participants or attendees at the venue for statistical or marketing purposes.

Syndromic surveillance refers to specific information collected from mobile units for the purpose of recreating information trails and reconstructing interactions in the course of a time frame. This type of information may be useful in identifying and notifying individuals present at a location in which a contamination event occurred, or for identifying and notifying any individuals who may have been in contact with an individual found to have a contagious disease.

Figure 1:
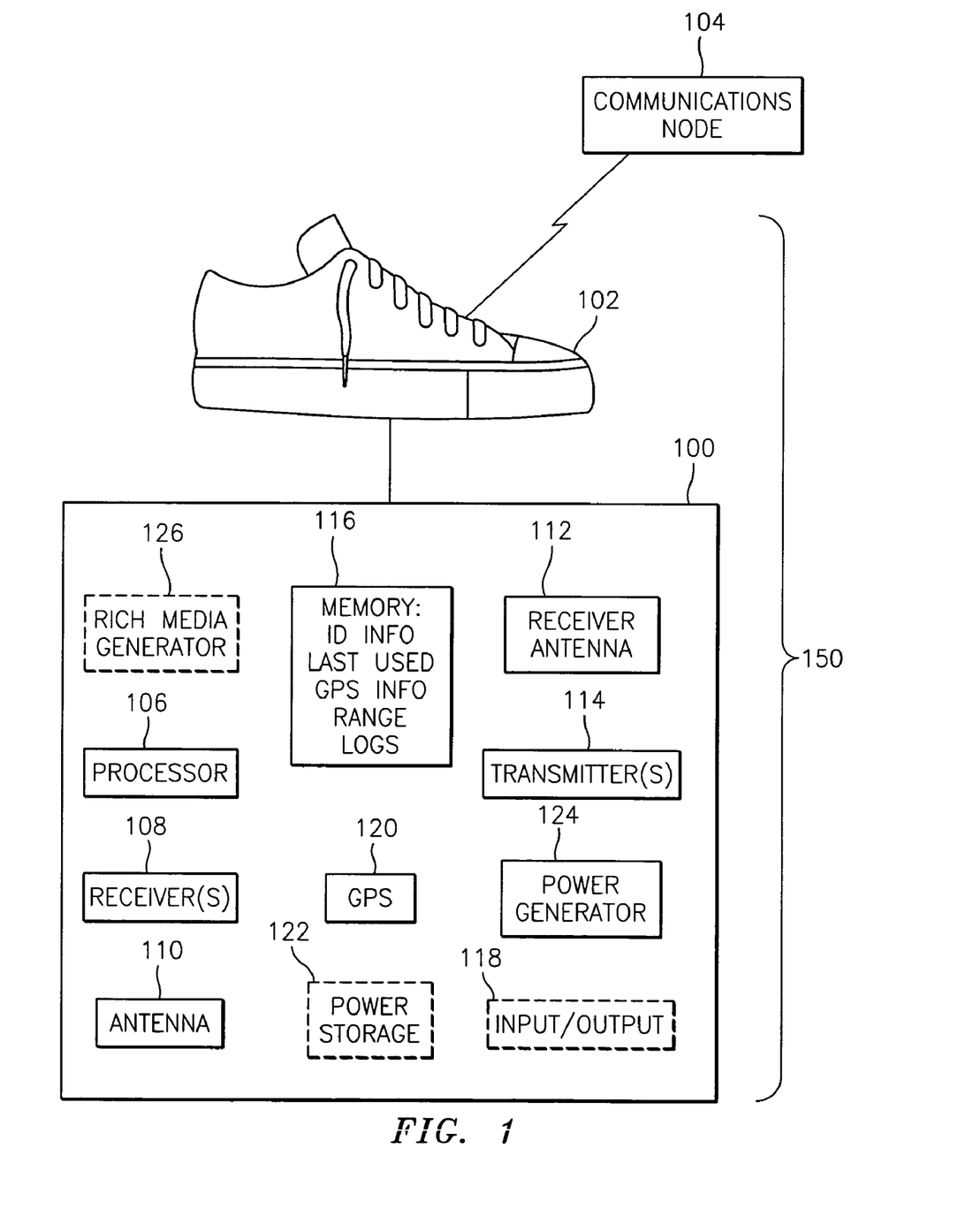
FIG. 1 is block diagram of a system for implementing the ad-hoc, autonomous communications network in exemplary embodiments.

Turning now to FIG. 1, a system upon which the ad-hoc, autonomous networking may be implemented in exemplary embodiments will now be described. The system of FIG. 1 includes mobile unit 150 including an article 102 embedded with various elements. The embedded components are collectively referred to as communications components 100 and enable the article 102 to create and maintain an ad-hoc, autonomous communications network. Article 102 may be, e.g., an article of clothing or personal object, and is capable of being transported by an individual or other animate object. By way of example, article 102 is shown in the system diagram of FIG. 1 as a sneaker.

The communications components 100 embedded within the article 102 include a processor 106, a receiver(s) 108, an antenna 110, a memory 116, a global positioning system (GPS) transceiver 120, a receiver antenna 112, transmitter(s) 114, and a power generator 124. Optionally, communications components 100 may also include a rich media generator 126, power storage 122, and input/output devices 118 (e.g., sensors, actuators, etc.). Article 102 and communications components 100 collectively form a mobile unit 150. It will be understood that communications components 100 may be incorporated into other objects as well, such as watches, pedometers, or other wearable, transportable items.

In accordance with exemplary embodiments, the ad-hoc, autonomous network activities, or a portion thereof, may be implemented via a client application associated with each mobile unit, e.g., a client application executing on processor 106. Alternatively, a simple logic gate array may be implemented in lieu of the processor 106 for rudimentary networking applications.

One or more receiver(s) 108 enable mobile unit 150 to receive communications broadcast from other network elements. These communications, both in substance and form, are referred to herein as transmission events. The transmission events broadcast from other network sources are received by receiver 108 via the receiver antenna 112. Likewise, the transmitter 114 enables the mobile unit 150 to broadcast transmission events to other network devices. Communications components 100 may also include a second antenna 110 for optimizing transmissions between mobile unit 150 and other communications nodes. One or more antennae, including antenna 110, may be positioned at fixed locations on the article 102 (e.g., front facing, rear-facing, sides) in order to enhance the quality of the communications. Alternatively, one or more antennae, including antenna 110, may be employed for accommodating signals utilizing various communications protocols (e.g., Bluetooth, ultra wideband, etc.).

Transmission events may comprise various forms, such as an identifier identifying a broadcasting mobile unit or other mobile unit, a location of the broadcasting mobile unit, a time that the broadcasting mobile unit is at the location, a brand identifier identifying a manufacturer of the broadcasting mobile unit, entertainment content such as lights, text, rich media, and audio elements.

The global positioning system (GPS) 120 transceiver enables the mobile unit 150 to track its location as it travels from one area to the next by sending signals to, and receiving signals from, a GPS network. The memory 116 may be a temporary storage element that holds data for a limited period of time. Alternatively, a non-volatile storage element (e.g., flash memory) may be employed to maintain information elements. Memory 116 may store items such as the identifier of the mobile unit 150, the location derived from GPS transceiver 120, distance measured while traveling, and logs of statistical data (e.g., location information and time).

Power generator 124 provides the energy required to enable communications or transmission events, as well as implement other items comprising communications elements 100. In accordance with exemplary embodiments, power generator 124 is mechanically charged and may be recharged as needed. Power generator 124 may be implemented in various ways. For example, power generator 124 may be implemented using a weight-driven (e.g., eccentric weight) mechanism. Alternatively, power generator 124 may be implemented using a solar cell incorporated, e.g., into the article 102, along with a small rechargeable battery or capacitor for allowing short power retention. Alternatively, a piezoelectric deformable element may be incorporated into the article 102 that generates small voltages with each movement or step or emits a fast series of pulses with each step (e.g., ultra wideband emission). In this embodiment, the article 102 may be designed with a piezo element that is disposed between compressible and non-compressible elements, such that each step would cause the compressible and non-compressible elements to bear down on the piezo element, thus emitting a charge.

In alternative exemplary embodiments, a power source (e.g., a battery) may be included in the communications components 100 for supplying power to the article 102. The mechanically produced power described above may then be used for recharging the power source when needed.

As shown in the system diagram of FIG. 1, communications elements may alternatively include a rich media generator 126, power storage 122, and input/output elements 118. The rich media generator 126 may comprise, e.g., digital camera or image capture equipment. An image may be captured via the rich media generator 126 and broadcast to other communications devices or mobile units. Power storage 122 enables mobile unit 150 to temporarily store power that was generated by power generator 124. Power storage 122 may comprise, for example, ultra capacitors capable of rapidly storing instantaneous charge spikes, or other suitable devices. Input/output elements 118 allow an individual to control the transmission events broadcast to others and to perceive the incoming transmission events. For example, an input element may be provided that allows an individual to select or target a recipient mobile unit for receiving a transmission event. The individual may further select a response activity that is implemented in response to a transmission event (e.g., flash blue lights on sneaker when desired target receives transmission event or is in broadcast proximity). The input/output elements 118 may include some type of display for receiving transmission events in text form, or a speaker for presenting transmission events in audio form, etc.

In exemplary embodiments, mobile unit 150 is in communication with a communications node 104 as shown in the system diagram of FIG. 1. Communications node 104 may be another mobile unit, a telephone, cell phone, pager, personal digital assistant, server, or other communications device.

Figure 2:
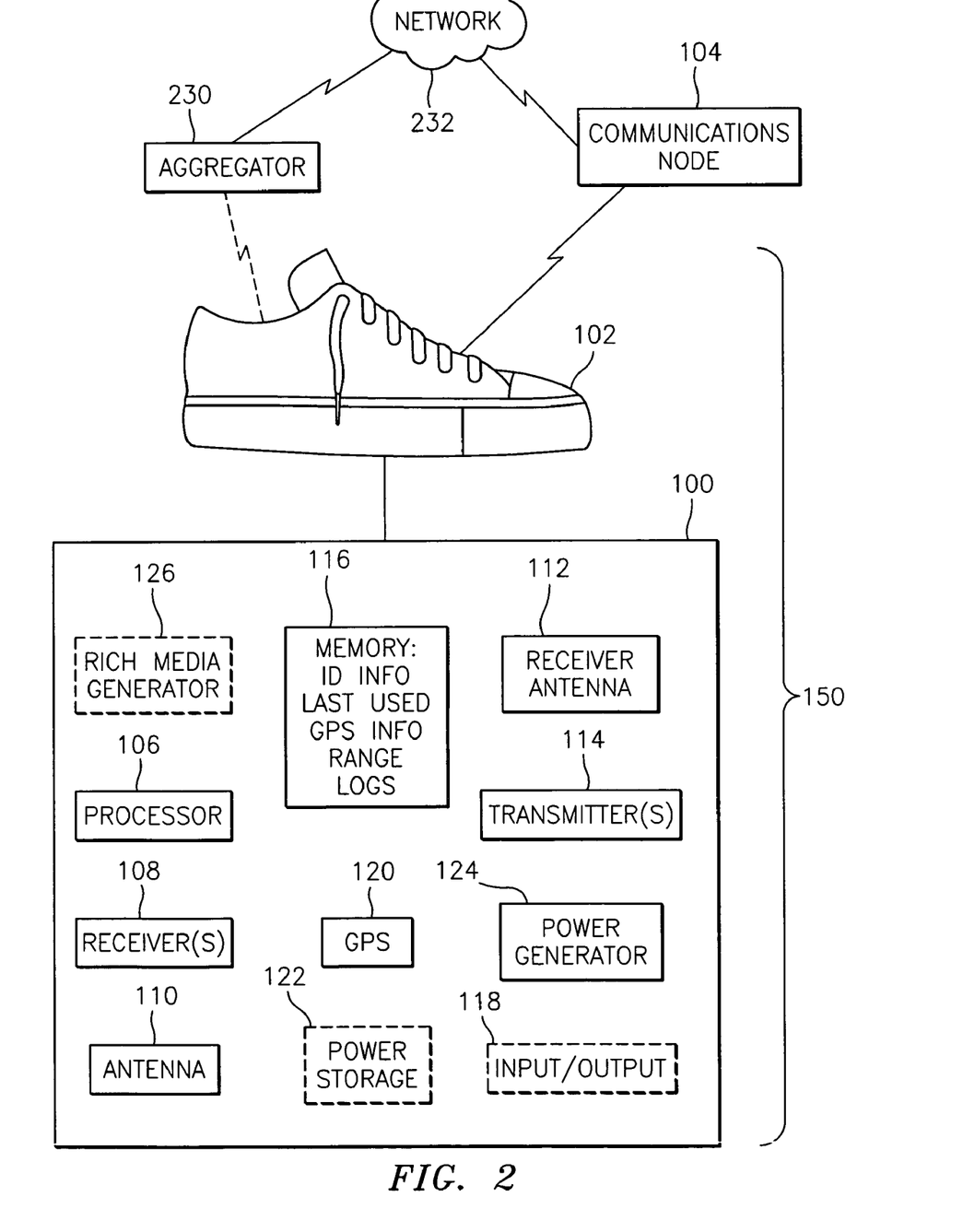
FIG. 2 is a block diagram of a system for implementing the ad-hoc, autonomous communications network in alternative exemplary embodiments.

Turning now to FIG. 2, a system for implementing ad-hoc, autonomous networking activities in alternative exemplary embodiments will now be described. The system of FIG. 2 incorporates many of the same or similar elements as those described above with respect to FIG. 1. Unless indicated otherwise, the elements shown and described in FIG. 2 perform substantially the same functions as those described above in FIG. 1. The system of FIG. 2 includes an aggregator 230 in communication with a network 232. Alternatively, aggregator 230 may be directly in communication with mobile unit 150. Aggregator 230 collects information broadcast from mobile units such as mobile unit 150 and may be implemented by a server, personal computer, or other suitable processor device.

As indicated above, there may be various uses for the ad-hoc networking system, including entertainment, automatic information collection, and syndromic surveillance. Aggregator 230 may gather the information directly from mobile unit 150 if within proximity of mobile unit 150. Alternatively, aggregator 230 may collect information indirectly from mobile unit 150, e.g., through communications node 104 and network 232. In alternative embodiments, aggregator 230 may comprise a mobile unit configured with advanced features (e.g., additional memory, advanced power generator, etc.) for collecting greater quantities of information from other mobile units.

Figure 3:
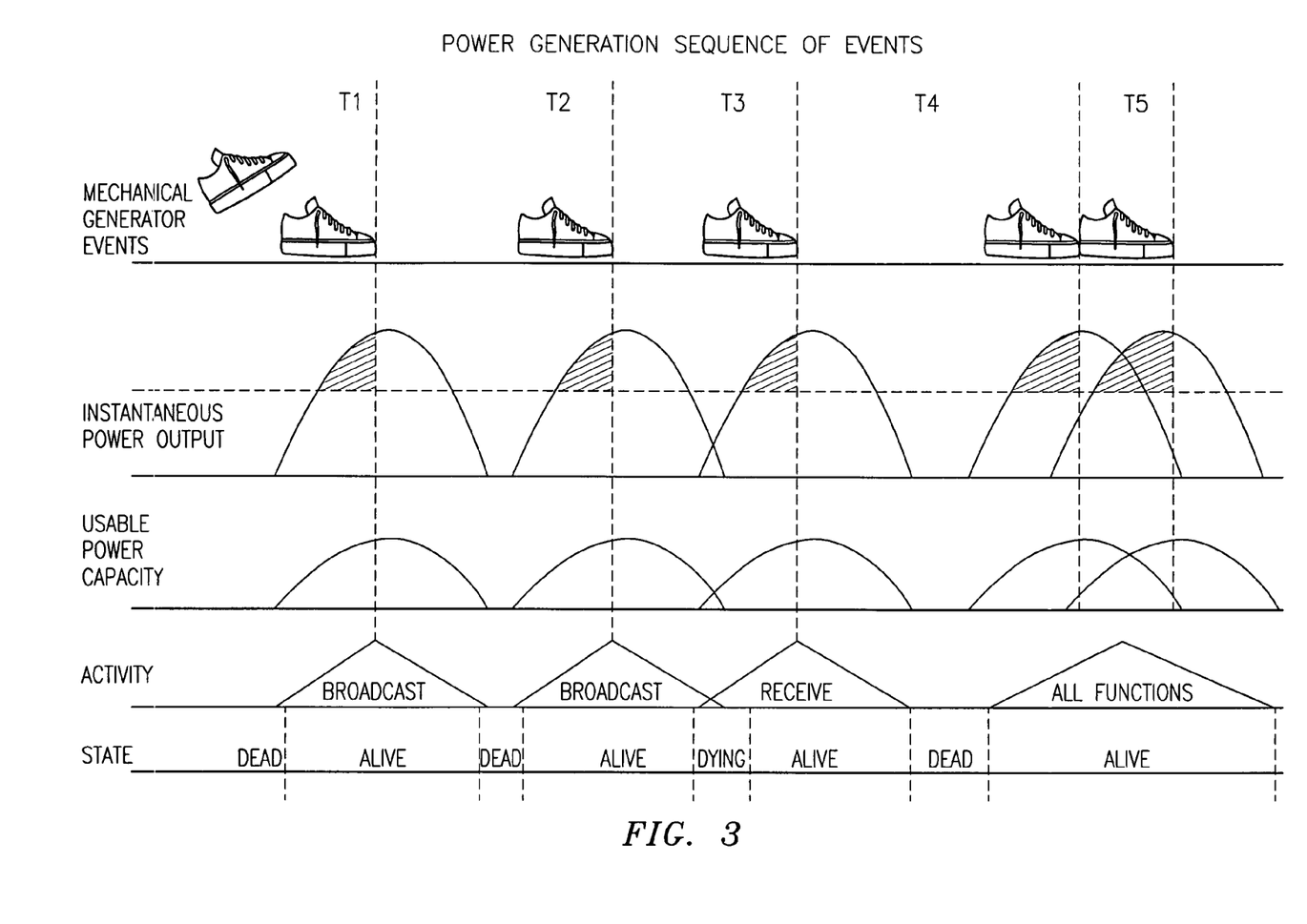
FIG. 3 is a diagram depicting time-sequenced events associated with the generation of power for mobile units implementing the ad-hoc, autonomous communications network.

Turning now to FIG. 3, a diagram illustrating a sampling of time-sequenced power generation events will now be described in exemplary embodiments. The diagram of FIG. 3 displays five time periods (T1-T5) through which a mobile unit is mechanically generating power. At each time period, the diagram of FIG. 3 illustrates a corresponding power output, storage capacitance, activity, and state items relating to the mobile unit. The mobile unit may be in one of three power states: dead, alive, and dying. As can be seen from FIG. 3, prior to T1, the mobile unit is in a dead state. During T1, the motion of the mobile unit (MECHANICAL GENERATOR EVENTS) causes the power generator to generate power (INSTANTANEOUS POWER OUTPUT). The power increases and decreases in proportion to the extent of movement. At T1, the storage capacitance also increases and decreases in proportion to the extent of movement (USABLE POWER CAPACITY). As shown in FIG. 3, during the period of T1 when the mobile unit has power, it is able to broadcast or receive a transmission event (ACTIVITY). The corresponding state of the mobile unit at this time is ALIVE. Between T1 and T2, there are no mechanical generator events occurring and there is no power output. Accordingly, the state of the mobile unit at this time is DEAD, which means the mobile unit is unable to broadcast or receive transmission events. However, this does not necessarily mean that all previously transmitted and received information is gone. The information may 'live on', e.g., through passing the information on to other mobile units (i.e., as from one broadcast to the next or from one transmission event to the next) referred to herein as stigmergy. Alternatively, if the mobile unit 150 includes non-volatile memory, the information may be accrued over time and stored in the non-volatile memory and so may likewise 'live on' even when the power state of the mobile unit 150 is DEAD. It will be understood that mobile units 150 may be configured such that some have non-volatile memory incorporated therein while others have temporary storage capabilities.

Moving forward to the time periods of T2 and T3, the rate of mechanical generator events has diminished, although not halted, and the power output is weakening. At this time, the state of the mobile unit is DYING, which means that the mobile unit has limited ability to broadcast or receive transmission events. As shown in time periods T4-T5, the rate of the mechanical generator events increases resulting in greater power output. With optimized power output capabilities, the mobile unit may be capable of performing other functions in addition to broadcasting and receiving transmission events. For example, the mobile unit may seek out a GPS location status, collect and log information elements produced from recently received transmission events, send transmission events that require more substantial power (e.g., image capture and transmission), etc.

Figure 4:
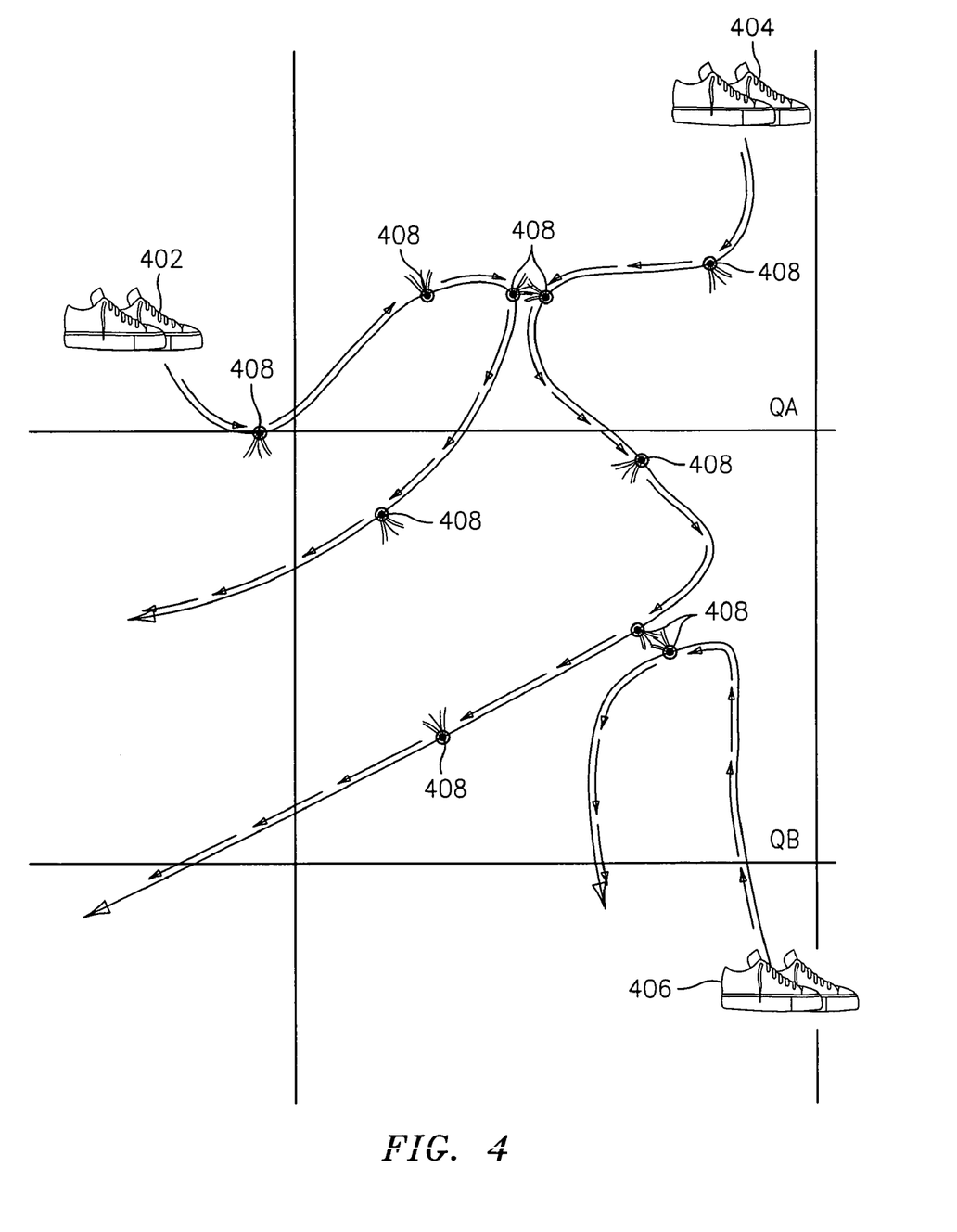
FIG. 4 is a diagram illustrating a sample interaction between three mobile units implementing the ad-hoc, autonomous communications network.

Turning now to FIG. 4, a diagram depicting a stigmergic application of ad-hoc, autonomous networking (e.g., syndromic surveillance) will now be described in accordance with exemplary embodiments. The diagram of FIG. 4 illustrates two regional quadrants (QA and QB) and three mobile units 402, 404, and 406. Though quadrants are shown in FIG. 4 for ease of illustration, it should be appreciated that the invention is applicable to any arrangement of geographic regions. Each of quadrants QA and QB represent a geographic region whereby mobile units present in the quadrants are discoverable by one another. Likewise, a mobile unit in one quadrant may not be discoverable by a mobile unit in the other quadrant. Each of mobile units 402, 404, and 406 follow a unique pathway, periodically broadcasting a transmission event 408. When mobile unit 402 enters quadrant QB, it sends out a broadcast (TE1), which goes undiscovered. On the second broadcast in quadrant QB, it discovers mobile unit 404, which receives the transmission event (TE1) and sends out its own transmission event (TE2). The transmission event (TE1) may be temporarily stored by mobile unit 404. Subsequently, mobile unit 404 enters quadrant QB. In its second broadcast in quadrant QB, it discovers mobile unit 406, and sends out transmission event (TE2) and may further send all or a portion of TE1 captured from mobile unit 402. Mobile unit 406 then continues along its pathway. By passing along transmission information from one mobile unit to the next in a stigmergic fashion, the transmission information may be sustained indefinitely, even when the information is purged from the temporary storage previous mobile units. Acquiring this information can be useful in retracing events and individual contacts for conducting syndromic surveillance or other applications.

As indicated above, the ad-hoc, autonomous networking system enables mobile units to be in direct contact with communications devices or other mobile units within a given proximity. The mobile units may be wireless, wireline, or a combination of both. The information or transmissions may serve a variety of purposes, such as entertainment, social interaction, information collection, or syndromic surveillance. Additionally, the mobile units may be continuously charged and self-powered by mechanical means.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for implementing an ad-hoc, autonomous communications network, comprising:
    activating a power supply for a first article embedded with communications components, the power supply generated via a power generator of the communications components that is implemented by active motion of the first article, the power generator being mechanically charged and providing mechanically produced electrical power to establish an alive power state;
    broadcasting a first transmission event via the communications components of the first article for a time period less than or equal to the duration of the alive power state;
    detecting a communications node within a proximity of the first article, the communications node comprising a second article embedded with communications components, the communications components of the second article including a power supply, the power supply generated by a power generator that is implemented via active motion of the second article, the power generator of the second article being mechanically charged and providing mechanically produced electrical power to establish an alive power state; and
    the second article detecting a presence of a third article within proximity of the second article, wherein the first article and the third article are not in broadcast proximity of each other;
    wherein the second article continues broadcast of the first transmission event when the duration of the alive power state of the first article has ended.

2. The method of claim 1, wherein the communications components of the second article further performing:
    temporarily storing the first transmission event at the second article;
    broadcasting the first transmission event by the second article for a time period less than or equal to the duration of the alive power state of the second article; and
    wherein the third article is embedded with communications components, the communications components of the third article including a power supply, the power supply generated by a power generator that is implemented by active motion of the third article, the power generator of the third article being mechanically charged and providing electrical power to establish an alive power state.

3. The method of claim 1, wherein the second article broadcasts a second transmission event originating from the second article.

4. The method of claim 2, wherein the first transmission event comprises:
    an identifier of at least one of:
        the first article;
        the second article;
        the third article; and
        the communications node;
    a location of at least one of the first and second articles;
    a time that the at least one of the first and second articles are at the location;
    a brand identifier of the at least one of the first and second articles; and
    entertainment elements, comprising at least one of:
        text;
        rich media; and
        audio elements; and
    wherein the first transmission event is selectable via at least one of the first article and the second article.

5. The method of claim 2, wherein the first transmission event comprises entertainment elements comprising lights that are activated upon discovery of at least one of the first, second, and third articles in proximity of the first transmission event.

6. The method of claim 1, wherein the first transmission event is selectively assigned to a target article including at least one of:
    articles embedded with communications components and within range of the first article;
    selected articles embedded with communications components that are identified by the first article;
    a stationary node; and
    an aggregator node for collecting transmission event information from articles embedded with communications components.

7. A system for implementing an ad-hoc, autonomous communications network, comprising:
    a first article embedded with communications components, the communications components comprising:
        a power supply generated by a power generator that is implemented via active motion of the first article, the power generator being mechanically charged and providing mechanically produced electrical power to establish an alive power state;
        a transmitter broadcasting a first transmission event, the first transmission event broadcasted for a time period less than or equal to the duration of the alive power state;
        a means for detecting a communications node within a proximity of the first article, the communications node comprising a second article embedded with communications components, the communications components of the second article including a power supply, the power supply generated by a power generator that is implemented via active motion of the second article, the power generator of the second article being mechanically charged and providing mechanically produced electrical power to establish an alive power state; and the second article detecting a presence of a third article within proximity of the second article, wherein the first article and the third article are not in broadcast proximity of each other;

wherein the second article continues broadcast of the first transmission event when the duration of the alive power state of the first article has ended.

8. The system of claim 7, wherein the communications components of the second article further comprises:
 a temporary storage location for temporarily storing the first transmission event;
 a transmitter for broadcasting the first transmission event for a time period less than or equal to the duration of the alive power state of the second article; and
 wherein the third article is embedded with communication components, the communications components of the third article including a power supply, the power supply generated by a power generator that is implemented via active motion of the third article, the power generator of the third article being mechanically charged and providing mechanically produced electrical power to establish an alive power state.

9. The system of claim 7, wherein the communications node is a stationary unit, comprising at least one of:
 a server; and
 a personal computer.

10. The system of claim 8, wherein the second article broadcasts a second transmission event originating from the second article.

11. The system of claim 8, wherein the first transmission event comprises:
 an identifier of at least one of:
  the first article;
  the second article;
  the third article; and
  the communications node;
 a location of at least one of the first and second articles;
 a time that the at least one of the first and second articles are at the location; and
 entertainment elements, comprising at least one of:
  text;
  lights;
  rich media; and
  audio elements.

12. The system of claim 8, wherein the first, second, and third articles further comprise a processor and at least one of:
 a global positioning system; and
 a rich media generator; and
 wherein the first transmission event is selectable via at least one of the first article and the second article.

13. The system of claim 8, wherein the first transmission event comprises a brand identifier of the at least one of the first and second articles.

14. The system of claim 7, wherein the first transmission event is selectively assigned to a target article including at least one of:
 articles embedded with communications components and within range of the first article;
 selected articles embedded with communications components that are identified by the first article;
 a stationary node; and
 an aggregator node comprising a means for collecting transmission event information from the articles.

15. The system of claim 7 wherein:
 the first article is footwear, each step on the footwear causing the power generator to emit a charge.

16. A non-transitory computer readable medium encoded with a computer program product for implementing an ad-hoc, autonomous communications network, the computer program product including instructions for causing a computer to perform a method, comprising:
 activating a power supply for a first article embedded with communications components, the power supply generated via a power generator of the communications components that is implemented by active motion of the first article, the power generator being mechanically charged and providing mechanically produced electrical power to establish an alive power state;
 broadcasting a first transmission event via the first article for a time period less than or equal to the duration of the alive power state;
 detecting a communications node within a proximity of the first article, the communications node comprising a second article embedded with communications components, the communications components of the second article including a power supply, the power supply generated by a power generator that is implemented via active motion of the second article, the power generator of the second article being mechanically charged and providing mechanically produced electrical power to establish an alive power state; and
 the second article detecting a presence of a third article within proximity of the second article, wherein the first article and the third article are not in broadcast proximity of each other;
 wherein the second article continues broadcast of the first transmission event when the duration of the alive power state of the first article has ended.

17. The computer readable medium of claim 16, wherein the communications components of the second article, the computer program product further comprising instructions for performing:
 temporarily storing the first transmission event at the second article;
 broadcasting the first transmission event by the second article for a time period less than or equal to the duration of the alive power state of the second article; and
 wherein the third article is embedded with communications components, the communications components of the third article including a power supply generated by a power generator that is implemented via active motion of the third article, the power generator of the third article being mechanically charged and providing electrical power to establish an alive power state.

18. The computer readable medium of claim 16, wherein the second article broadcasts a second transmission event originating from the second article.

19. The computer readable medium of claim 17, wherein the first transmission event comprises:
 an identifier of at least one of:
  the first article;
  the second article;
  the third article; and
  the communications node;
 a location of at least one of the first and second articles;
 a time that the at least one of the first and second articles are at the location;

brand identifier of the at least one of the first and second articles; and entertainment elements, comprising at least one of:
- text;
- lights;
- rich media; and
- audio elements.

20. The computer readable medium of claim 17, wherein the first transmission event is selectable via at least one of the first article and the second article.

21. The computer readable medium of claim 16, wherein the first transmission event is selectively assigned to a target article including at least one of:
- articles embedded with communications components and within range of the first article;
- selected articles embedded with communications components that are identified by the first article;
- a stationary node; and
- an aggregator node for collecting transmission event information from the articles.

* * * * *